No. 768,126. PATENTED AUG. 23, 1904.
G. A. HUBER.
HAND PUNCH.
APPLICATION FILED DEC. 1, 1903.
NO MODEL.

Witnesses
Alfred A. Eicks
M. S. Drion

Inventor
George A. Huber
by Higdon & Longan & Hopkins Attys

No. 768,126. Patented August 23, 1904.

UNITED STATES PATENT OFFICE.

GEORGE A. HUBER, OF ST. LOUIS, MISSOURI.

HAND-PUNCH.

SPECIFICATION forming part of Letters Patent No. 768,126, dated August 23, 1904.

Application filed December 1, 1903. Serial No. 183,421. (No model.)

*To all whom it may concern:*

Be it known that I, GEORGE A. HUBER, a citizen of the United States, residing at St. Louis, State of Missouri, have invented certain new and useful Improvements in Hand-Punches, of which the following is a specification containing a full, clear, and exact description, reference being had to the accompanying drawings, forming a part hereof.

My invention relates to improvements in a hand-punch; and it consists of the novel construction hereinafter described and claimed.

The object of my invention is to construct a punch to be used for the purpose of perforating material used in the construction of trunks, grips, or the like, through which bolts, rivets, or screws are passed.

A further object of my invention is the manner of capping the upper portion of the handle, protecting it from destruction by the continuous concussion caused by the use of a maul, hammer, or the like.

Figure 1:
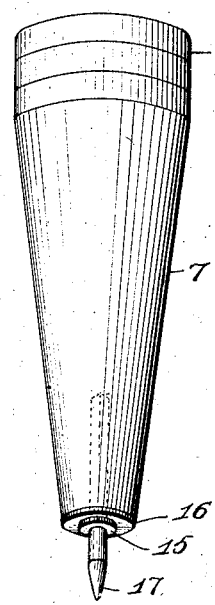
Figure 2:
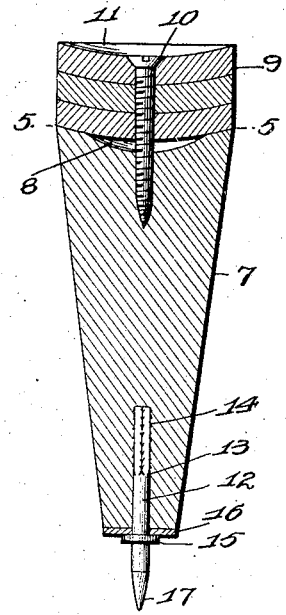
Figure 3:
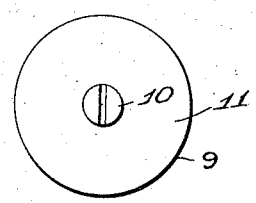
Figure 4:
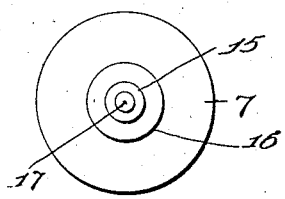
Figure 5:
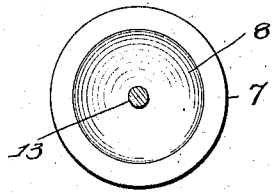
Figure 6:
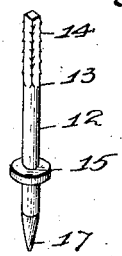

In the drawings, Figure 1 is a perspective view of my complete invention. Fig. 2 is a vertical sectional view of the same. Fig. 3 is a top plan view. Fig. 4 is a bottom plan view of the same. Fig. 5 is a cross-sectional view taken on the line 5 5 of Fig. 2. Fig. 6 is a detail perspective view of the punch-point made use of in carrying out my invention.

In the construction of my invention I provide a handle 7, the upper end of which is provided with a depression 8, acting as an air space or cushion. Upon the top of the handle 7 is provided a plurality of resilient disks 9, securely held to said handle by means of a screw 10, and when properly attached will cause the said disks to assume a curvilinear shape, causing a depression 11 to be formed in the upper disk, as shown in Fig. 2.

In the handle 7, at the bottom, is inserted the punch-pin 12, consisting of the shank 13, its end being squared and provided with barbs 14, which when inserted into the handle will be rigidly retained therein.

The shank 13 is provided with a shoulder 15, which is to come in contact with a washer 16, placed over said shank and located between the handle and shoulder 15. The free end of the shank 13 is pointed, as indicated by the numeral 17, which end is to be brought in contact with the material to perforate the same.

Having fully described my invention, what I claim is—

1. A device of the class described, comprising a handle provided with a depression in its upper end, a plurality of resilient disks placed against the upper end of the handle covering said depression, and a screw inserted through said disks to hold said disks in position and to cause said disks to assume a curvilinear shape and forming an air-cushion in said depression, substantially as specified.

2. A device of the class described, comprising a handle, a punch-point secured in said handle, a shoulder formed on said punch-point, a washer located intermediate between said shoulder and handle, a plurality of resilient disks secured to the handle, an air-cushion formed between the handle and the lower disk, a screw supporting said disks upon the handle, and a plurality of barbs formed on the end of the punch-point inserted in the handle for retaining the same in rigid position, substantially as specified.

In testimony whereof I have signed my name to this specification in presence of two subscribing witnesses.

GEORGE A. HUBER.

Witnesses:
ALFRED A. EICKS,
M. G. IRION.